(12) United States Patent
Heikkinen et al.

(10) Patent No.: US 6,279,384 B1
(45) Date of Patent: Aug. 28, 2001

(54) METHOD FOR TREATING A PRODUCT AND A LEAK-DETECTION DEVICE

(75) Inventors: Eero Heikkinen, Espoo; Eero Hurme, Helsinki; Raija Ahvenainen, Espoo, all of (FI)

(73) Assignee: Espoon Paineilma Oy, Espoo (FI)

( * ) Notice: Subject to any disclaimer, the term of this patent is extended or adjusted under 35 U.S.C. 154(b) by 0 days.

(21) Appl. No.: 09/171,342

(22) PCT Filed: Apr. 15, 1997

(86) PCT No.: PCT/FI97/00232

§ 371 Date: Apr. 21, 1999

§ 102(e) Date: Apr. 21, 1999

(87) PCT Pub. No.: WO97/39322

PCT Pub. Date: Oct. 23, 1997

(30) Foreign Application Priority Data

| Apr. 15, 1996 | (FI) | 961648 |
| Feb. 11, 1997 | (FI) | 970583 |
| Feb. 17, 1997 | (FI) | 970665 |

(51) Int. Cl.[7] ............... G01M 3/04; G01M 3/34
(52) U.S. Cl. ................................. 73/40.7; 73/49.3
(58) Field of Search ................ 73/40.7, 49.3, 73/40, 52, 45.4

(56) References Cited

U.S. PATENT DOCUMENTS

| 4,510,792 | 4/1985 | Morel et al. ............... 73/40.7 |
| 4,583,394 | 4/1986 | Murakami et al. . |
| 4,879,896 | 11/1989 | Miller et al. ............... 73/46 |
| 5,029,463 | 7/1991 | Schvester et al. . |
| 5,361,626 | 11/1994 | Colligan et al. . |
| 5,373,729 | 12/1994 | Seigeot . |
| 5,386,717 | 2/1995 | Toda . |
| 5,499,529 | 3/1996 | Kronberg et al. . |
| 5,992,217 | 11/1999 | Jax et al. ............... 73/40 |

FOREIGN PATENT DOCUMENTS

| 0194780 | 9/1986 | (EP) ............... A21D/13/00 |
| 702 222A1 | 3/1996 | (EP) . |
| 1 157 009 | 7/1969 | (GB) . |
| 1188170 | 4/1970 | (GB) ............... B32B/33/00 |

*Primary Examiner*—Hezron Williams
*Assistant Examiner*—Jay L. Politzer
(74) *Attorney, Agent, or Firm*—Pillsbury Winthrop LLP

(57) ABSTRACT

A method for detecting a leak in a resilient, semi-hard and hard package includes a test gas supplied to the package to subject the contents of the package to a first pressure. The package is then maintained for a predetermined time in a chamber having a gas pressure, and the presence of gas is detected in a measuring space in gas flow relationship with the chamber by a detection apparatus. In order for the method to be rapid enough to be suitable for detecting very small holes in packages and for use in production plants without a change in their operating rate, a hydrogen gas having a hydrogen gas concentration from 0.0001–6% by volume is used as the test gas supplied to the package, and the hydrogen gas concentration of the gas within the chamber is maintained below a reference concentration that is lower than the hydrogen gas concentration in the package immediately after the addition of hydrogen gas to the package. If hydrogen gas that has leaked outside the package into the chamber is detected and the package is considered defective, if the detected hydrogen gas content is higher by a predetermined value than the reference concentration after the predetermined time. The method also improves the shelf life of the quality of a product in the form of a foodstuff.

20 Claims, 2 Drawing Sheets

METHOD FOR TREATING A PRODUCT AND A LEAK-DETECTION DEVICE

This application is the national phase of international application PCT/FI97/00232 filed Apr. 15, 1997 which designated the U.S.

BACKGROUND OF THE INVENTION

1. Field of the Invention

The invention relates to a method for treating a product in the form of a foodstuff or a pharmaceutical. The method detects leaks in a package, particularly in a food and pharmaceutical package and increases the shelf life of the quality of the foodstuff and pharmaceutical by determining the integrity and tightness of the package nondestructively. The invention also relates to a device for detecting a leak in a food or pharmaceutical package, containing a product in the form of a foodstuff or a pharmaceutical.

2. Description of Related Art

It is known to treat foodstuffs by preserving them in substantially oxygen-free packages to reduce the aging effect of oxygen on the product. The integrity of the package is important to guarantee the freshness and safety of a product in the package, such as a foodstuff, for a specified period of time. For that purpose, foodstuffs are often packed in airtight, airless packages. The packing material may vary. Various soft and semi-hard plastic packages and wax and plastic coated cardboard packages are generally used. The packages may also be hard, typically glass and metal packages. If there is a hole in the package and it leaks, the contents of The package spoil in a considerably shorter time than the projected shelf life of The product. Depending on the contents of the package, the spoilage may appear as too high of a bacterial content, a taste defect, an odor defect, a color defect, or a viscosity defect The size of a permissible hole varies depending on the contents, the storage conditions and the required shelf life of the package. Holes larger than about 20–30 $\mu$m should normally not be permitted in packages. Holes having a size below 10 $\mu$m usually do not present any problems.

A conventional nondestructive method for testing the integrity of a package is to place the package in a vacuum chamber. If the vacuum changes, the package is determined to be defective. Another way is to immerse the package in liquid and to monitor whether bubbles are formed in the water; if so, the package leaks.

All of the above methods can be used, but have the problem of being too slow. They are only suitable in spot tests for testing package tightness in production plants. Hence, it is not possible to maintain a sufficient production rate in production plant if every package was tested by the above methods.

To provide faster testing methods it is known to add gas to a package, to place the package in a chamber which has been evacuated of air and/or whose pressure is lower than that of the package, and to measure the gas leaking from the package into the chamber. U.S. Pat. No. 5,029,463 discloses such a method for detecting a leak in a package. The purpose of the method is to operate at the same speed as the packaging line. It has been contemplated to use helium as a test gas. Since helium is an inert gas, it can be used safely in conjunction with many materials. The example in the publication teaches that the testing time is 30 seconds when the test gas contains helium. 1–5% by volume is recommended as the concentration of helium in the tracer gas, the remainder being carbon dioxide or nitrogen. The publication states that gases other than helium, such as $CO_2$, $N_2O$, $CH_4$, can be used as a test gas. The drawback of the method of U.S. Pat. No. 5,029,463 is that it is too slow to be used in conventional fast production plants. Furthermore, this method requires creating a relatively deep negative pressure in the chamber in order to achieve an adequately short dwell time for measuring. Creating a deep negative pressure is time-consuming and requires expensive equipment. The time for creating the required negative pressure and the testing time are not sufficiently short to allow the method to be implemented in a fast production plant for testing every package. The drawbacks of helium also include the fact that normal air contains helium which must be removed from the measuring chamber in order for the helium in the air not to interfere with the measurement, which further slows down the method. Alternatively, the helium content of the test gas added into the package must be high, which makes the method expensive. U.S. Pat. No. 5,029,463 also discloses an apparatus for detecting a leak in a package. Since the device is based on the method in which helium has been recommended for use as a test gas, the apparatus comprises a plate within a test chamber, adapted to springedly press the package when the package is in the chamber. The shape of the plate is selected in accordance with the shape of the package. The plate makes the apparatus complicated.

U.S. Pat. No. 5,386,717 discloses a method for detecting a leak in a package. In accordance with the method, helium is used as a probe gas. 1.3–13 mbar (1 torr–10 torr) is recommended as the pressure for the test chamber. Creating such a negative pressure is expensive and time-consuming. Helium has the drawbacks set out above. Since air naturally contains helium (about 5 ppm) which may interfere with the test results, in accordance with the publication, the chamber must be purged. The purging gas must not contain any probe gas. Since air cannot be the purging gas, gases must be used as purging gases that make the method expensive to implement. As the purging gas is removed from the chamber in connection with each test period, a new purging gas must be supplied before the next test. In the publication, hydrogen gas is not believed to be suitable for use as a probe gas, as hydrogen is thought to cause measurement errors when a negative pressure is generated in the test chamber. The publication also discloses an apparatus for carrying out the method. In accordance with the above, the apparatus comprises an expensive vacuum means and means for flushing the test chamber with a purging gas.

U.S. Pat. No. 5,499,529 discloses a method for detecting a leak in a package. In accordance with the method, a tracer gas heavier than helium, preferably $SF_6$ or $CF_4$, is used. The gas is selected so as not to diffuse from the package outwardly through the packing material. A drawback of helium that has been mentioned, for example, is the fact that it may diffuse through plastic film, rubber, paper etc., which are generally used for packages.

SUMMARY OF THE INVENTION

It is an object of the present invention to provide a method for treating a product in the form of a foodstuff or a pharmaceutical to improve or secure the shelf life of the product. According to the method, the product is surrounded by a hydrogen-containing, at least substantially oxygen-free, gas mixture having a hydrogen content of 0.0001–6% by volume.

The instant method for detecting a leak in soft, semi-hard and hard packages does not have the above-stated drawbacks. The instant method includes supplying a test gas to a package at a first pressure and detecting any hydrogen gas leakage to determine whether the package is defective. In one embodiment, the analyzer is typically moved manually to the immediate vicinity of the package to detect the leakage point. In another embodiment, a test chamber and a fixedly installed analyzer are used.

These embodiments use a hydrogen gas mixture as the test gas. The use of such a gas mixture has unexpectedly been found to be suitable for testing a leak in ordinary, ie., commonly used, food packages. The diffusion of hydrogen through an intact package is not harmful, as the measurement is typically carried out much earlier than any perceptible diffusion through the packing material can take place. Contrary to the prevailing idea, hydrogen can be detected by a fairly simple and inexpensive installation, which will be explained hereinbelow. The background hydrogen gas content in air in a normal industrial environment, 0.5 ppm, is exceeded more than twice when 0.0001% by volume has been selected as the lower limit of the hydrogen gas content in the test gas. By such a selection, the background hydrogen gas content does not interfere with the measurement. The upper limit of 6% by volume has been selected based on the fact that hydrogen gas can ignite when it is present in an amount in excess of about 6% by volume. Safety reasons limit the hydrogen content below the upper limit.

One advantage of the method of the instant invention is that it is so rapid that it is suitable for use directly on package-conveying production lines to measure the integrity of, or any leak in, each package without any need to slow down the speed of the production lines. Very small holes, even holes less than 10 μm which previously could not be detected within a reasonable time, can be rapidly detected. The method of the invention does not require a large amount of expensive test gas or any special purging gas. In this context, the expense of helium gas, for example, is many times that of hydrogen gas, and the purging gas is typically air. Furthermore, the device needed to carry out the invention is fairly inexpensive to manufacture. The method does not require creation of a deep negative pressure, and the purging of the test chamber may be performed by air flushing without needing special gases. Furthermore, based on tests carried out, the hydrogen gas contained in the test gas does not adversely affect the taste, odor, color or keeping properties of the product. It has very unexpectedly been found that the shelf life of ascorbic acid is better if a small amount of hydrogen gas is added to the nitrogen gas, i.e., the content of ascorbic acid in an orange drink decreases more slowly when the surrounding gas is a hydrogen gas-nitrogen gas mixture instead of a mere (100%) nitrogen gas.

The instant method also increases the shelf life of the quality of a product in the form of a foodstuff or a pharmaceutical. The method includes surrounding a product by a hydrogen containing gas mixture and placing the product in an airtight package. The use of a gas mixture of this kind has unexpectedly been found to retard the deterioration of the quality of the foodstuff caused by oxygen dissolved in the foodstuff.

A device according to the instant invention detects a leak in soft, semi-hard and hard packages without the above-stated drawbacks. The device includes a chamber for containing a package containing a test gas; transport means or transporter for transporting the package into the chamber; a sensor in a measuring space that is in gas flow connection with the chamber; a gas analyzer connected to the sensor, adapted to give a control signal depending on how much test gas has been detected; flushing means or purger for providing an air flush in the measuring chamber; and control logic for providing the control signal for the gas analyzer.

Because a hydrogen gas mixture is used as a test gas in the device in accordance with the invention, the components of the device are correspondingly selected for this purpose. It has unexpectedly been found that, with an inexpensive palladium sensor connected to a hydrogen gas analyzer, a possible leak in the package can be measured at a sufficient rate. Expensive mass spectrometric devices are not needed, nor are special purging gas containers, since air is suitable for use as the purging gas. Furthermore, no package-supporting plane or other device preventing deformations of the package when it is under negative pressure (cf. U.S. Pat. No. 5,029,463) are needed, since the method does not require a deep negative pressure.

Advantages of the device of the instant invention include that a possible leak in the package can be determined very quickly, typically in about one second. Furthermore, a leakage point in the package can be located by a manual sensor. The manufacturing and running costs for the device are relatively low, clearly lower than with prior art devices. Furthermore, a possible leak in a vacuum package, such as a coffee package, a processed food package, or a sausage package, can be measured with the device.

BRIEF DESCRIPTION OF THE DRAWINGS

The invention will now be described in greater detail with reference to the accompanying drawings, in which.

DETAILED DESCRIPTION OF THE INVENTION

Figure 1:
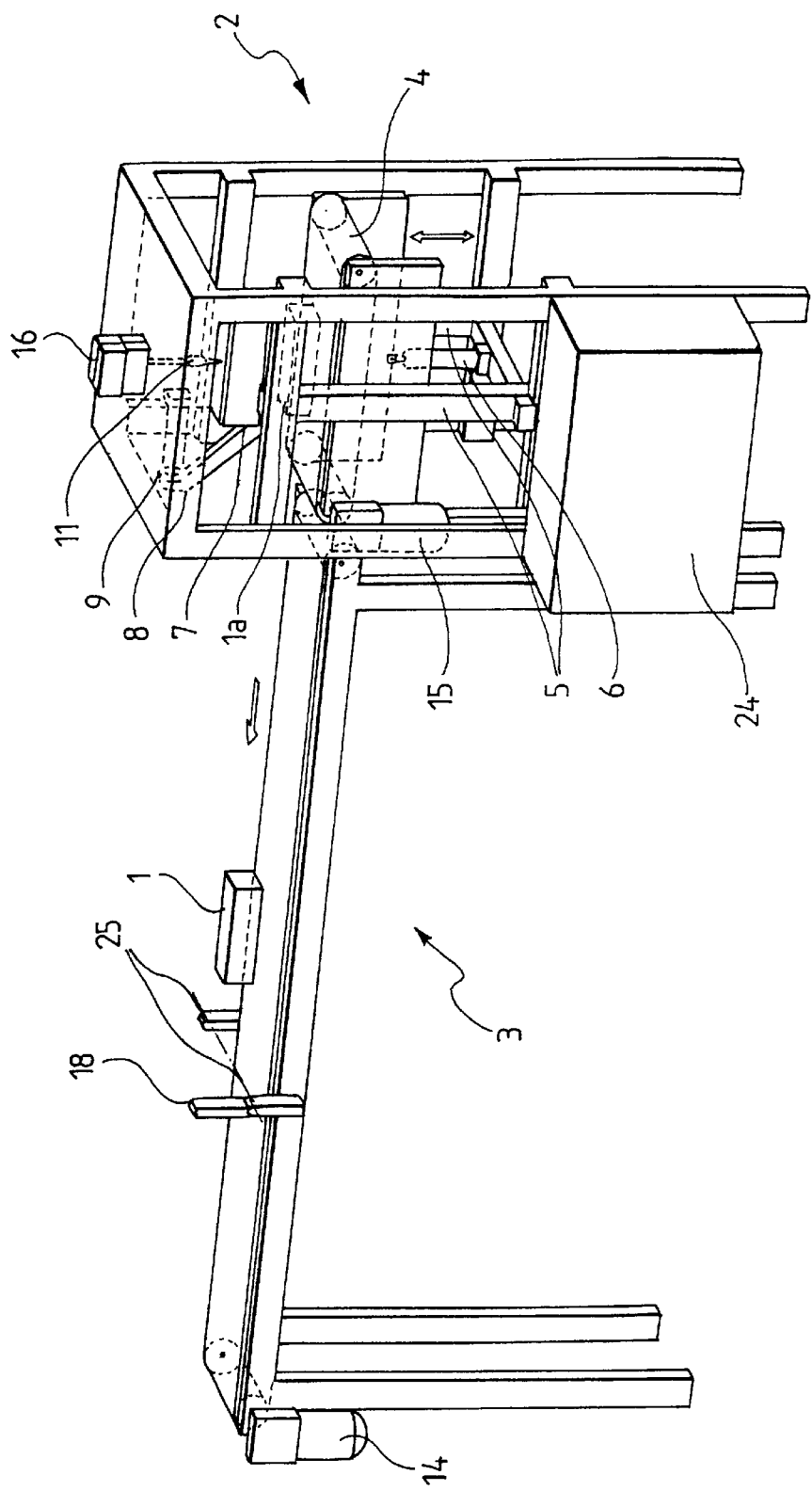
FIG. 1 illustrates a device according to the invention.

FIG. 1 illustrates a device for detecting a possible leak in package 1. With the device, it is determined whether the package has a hole the size of which exceeds a given permitted maximum size and which therefore does not meet the tightness requirement set for the package. The greatest permissible size for a hole is typically 30 μm, for example. If the sterility of the package is to be maintained for very long, for example, in the case of packages for pharmaceuticals, the permissible size is smaller. In principle, the package may also be defective if it contains several holes which together produce a leak that is too great.

The device of FIG. 1 includes a testing unit or measuring station denoted by reference number 2. A transport means or transporter for transporting a package 1 to the measuring station are not shown for simplicity. The transport means may be any device one of ordinary skill in the art would consider, such as a conveyor belt on the right-hand side of the measuring station, which can handle the necessary transport. Reference numeral 3 denotes a conveyor belt driven by a motor-worm gear combination 14 or conveying the package away from the measuring station 2. The device may include several measuring stations 2 in accordance with FIG. 1, depending on the production plant.

The measuring station 2 has a positioning conveyor 4 driven by a motor-worm gear combination 15. The conveyor can be moved in the vertical direction, as illustrated by a double arrow, by a lifting cylinder 6 and guided by guides 5. A package 1a placed on the positioning conveyor 4, denoted by the broken line, can be lifted into a measuring dome 7 by the lifting cylinder 6. Reference numeral 8 indicates a positioning member for installing a package 1 in a desired location on the positioning conveyor 4. The positioning member 8 has a positioning cylinder 9 which moves the positioning member to the side so that it is not in the way when the package is moved into the measuring dome. The measuring dome 7 has a chamber in which the package is measured. A measuring space 11 is connected to the measuring dome 7 through a filter 10 (cf. FIG. 2). Hence, the measuring dome 7 is in gas flow connection with the measuring space 11. The purpose of the filter 10 is to prevent possible dirt particles from migrating into the measuring space 11. The measuring space 11 contains a hydrogen-sensitive sensor 12. The sensor 12 is a type of palladium sensor. The palladium sensor 12 is very sensitive to hydrogen gas. As an alternative, a platinum sensor or some other sensor affording a sufficient detection rate may be used. A gas analyzer 13 is connected to the sensor 12. The combination formed by the gas analyzer 13 and sensor 12 is, for example, the device called "Solid State leak Detector 8505TM", marketed by Espoon Paineilma Oy and manufactured by Sensitor AB.

Figure 2:
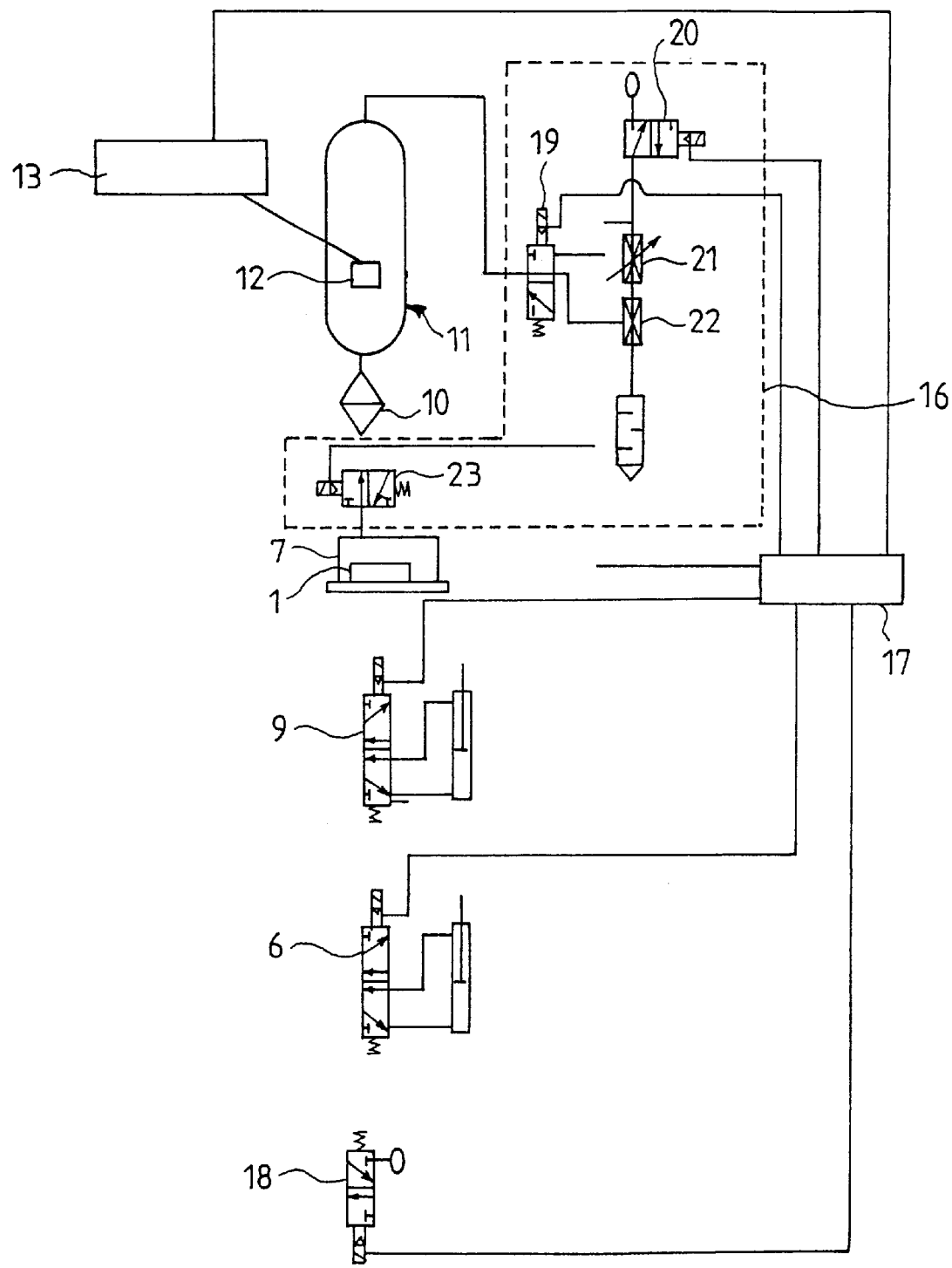
FIG. 2 illustrates the control of the operations of the device of FIG. 1.

Reference number 16 denotes a flow control unit, which is shown in more detail in FIG. 2. The flow control unit is controlled by programmable local 17. The control logic 17 is also adapted to control the positioning cylinder 9, the lifting cylinder 6 of the positioning conveyor, and a discarding valve 18 by which a defective package can be removed from the belt conveyor 3. Reference numeral 25 denotes optical sensors.

A flow control unit 16 comprises two 3/2 valves 19, 20, a flow control valve 21, art ejector 22, and a valve 23. With an ejector, a negative pressure is produced in the measuring dome 7 and the measuring space 11. Instead of the ejector 22, a vacuum means or a purger, such as a pump, may be used to create a vacuum within the measuring dome 7.

A control cabinet for the device, containing the control logic 17, is denoted with reference numeral 24.

In the following, operation of the device will be described in carrying out the method of the invention.

A package 1a, into which a hydrogen-containing test gas has been added during the packing step, is brought by a conveyor (not shown) to a positioning conveyor 4. The hydrogen-containing test gas preferably contains 0.5–5% by volume of hydrogen, the remainder being nitrogen, carbon dioxide, or a mixture of nitrogen and carbon dioxide. The gas mixture is, for example 5% by volume of hydrogen, 75% by volume of nitrogen, and 20% by volume of carbon dioxide. Carbon dioxide prevents organic products from microbial spoilage. The disadvantage of carbon dioxide is that it is more expensive than nitrogen. For this reason, among others, it is preferable for the test gas to contain a majority of nitrogen gas. Depending on the product to be packed, carbon dioxide is not necessarily needed in the test gas at all. A preferable nitrogen content in the test gas in conventional applications is at least 50% by volume. If it is desired to use carbon dioxide, its content is preferably, for example, 10–50% by volume. In principle, there is no need for a carbon dioxide content in excess of 70% by volume. The content of hydrogen gas may be higher than the range of 0.5–5% by volume. For reasons of safety, the maximum content of hydrogen gas in the test gas is 5–6% by volume. The content may be much lower than 0.5% by volume, but a very small hydrogen gas content will slow down the measurement. It is to be supposed that the hydrogen gas content must be at least 0.0001% by volume. In some rarer less critical applications, it is contemplated that nitrogen gas is entirely replaced by carbon dioxide.

The addition of a hydrogen-containing gas into the package is typically carried out in air pressure, ie., at about 1000 mbar. It is not necessary to add the hydrogen gas in connection with the packing of the product, for example, in a vacuum package, such as a coffee package, the hydrogen gas is added after the packing of the product. In that case, the addition is performed in a pressure chamber (not shown), for example, at a pressure of about 2000 mbar.

A positioning device 9 ensures that the package 1a will be correctly positioned on the positioning conveyor 4, after which it gives a signal to the control logic 17 of the device, which gives a command to a lifting cylinder 6. The positioning conveyor begins lifting so that the package 1a is lifted into the measuring dome 7. Lifting the package 1a into the measuring dome 7 is a better implementation than lowering of the measuring dome on top of the package because there is no need to move any electrical wires. It is, however, possible that the measuring dome 7 may be lowered.

Once the package 1a is within the measuring dome 7, an ejector 22 starts sucking air from the measuring dome 7 into the measuring space 11. The flow of suctioned air can be regulated by a flow control valve 21 controlled by the control logic 17. The suction is continued so that the pressure Pk within the measuring dome 7 is 500 mbar. The pressure Pk created in the measuring dome 7 is preferably within the range 200–800 mbar. It is contemplated that there is no need to create a vacuum within the measuring dorm 7, but it is possible that without the vacuuming, operation of the installation would be hindered to some extent, as the migration of hydrogen gas through a possible hole in the package is facilitated and accelerated the smaller the ratio Pk/Pp. For many applications, an arrangement is suitable according to which the gas pressure Pk within the measuring dome is 200–400 mbar lower than the pressure Pp of the test gas within the package. The gas pressure Pk within the measuring dome 7 must be at least 50 mbar lower than the pressure Pp of the test gas within the package. An exception to this, however, is a vacuum package, for example, a coffee package. The tightness of a vacuum coffee package, typically having a pressure of 50 mbar, can be successfully tested in a measuring dome 7 having as high a gas pressure Pk as about 800 mbar. There is no theoretical lower limit for the gas pressure Pk, but in practice, there is no need to go to pressures below 200 mbar, even in the testing of a vacuum package.

A gas pressure of 200–400 mbar can be rapidly created within the measuring dome 7 with a simple and inexpensive apparatus. Still more simply and rapidly, a pressure of 400–1000 mbar can be created in the measuring chamber 7. This range can be used if a very high speed is not sought for in the method. Even in such a high pressure range (400–1000 mbar), the method of the invention is fast compared with prior art methods.

In some rare applications, and typically in those in which it is important to be able to detect very small holes causing leakage, a gas pressure Pk as low as 50 mbar may be preferred.

When the package 1a is in the measuring dome 7, a sensor 12 in the measuring space 11 measures the hydrogen gas content. Typically about one second is a sufficient measuring time, i.e., dwell or predetermined time, T, to detect a hole as small as 30–50 $\mu$m. Depending on the package, the measuring time, i.e., dwell time, T, is 0.5–5 s. A sterile package the sterility of which must be maintained for several months, even years, the measuring time may be extended to about a minute. An analyzer 13 sends a signal to the control logic 17, which handles the necessary steps.

If the sensor 12 is in danger of becoming saturated, which means that too high a hydrogen content has entered the sensor, a valve 19 is controlled by the logic 17 to prevent the measurement from continuing. Then air flushing of the sensor 12 is performed, controlled by the control logic 17 through valves 19 and 23. The flushing takes care of the fact the hydrogen gas content in the measuring space 11 prior to the measurement of the package is below a given reference content, which must naturally be lower than the hydrogen gas content in the test gas. The reference content is, for example, about 10 ppm, which value air in an industrial environment falls short of. The sensor 12 is connected to the analyzer 13 wherefrom the measurement results are obtained as an analog voltage message.

Valve 20 is the main shut valve of the device. Valve 20 is open when the device is used and closed when the device is not used.

The logic 17 taking care of the control of the device is of programmable type. The programming has been performed to correspond to the requirements set on the package 1a to be measured and to the production rate. For the measurement results sent by the analyzer 13, an analogous input card is installed in the control logic 17. The control logic 17 registers the measurement results on the package to be measured. If the hydrogen gas content caused by a leak in any package exceeds a set limit value, for example 2 ppm, the program logic 17 registers the package to be disacarded from a belt conveyor 3, i.e., the production line. When the measurement has been performed, the package is lowered by the cylinder 9 and the package is allowed to pass onto the belt conveyor 3. The limit or predetermined value is dependent on the application.

Based on the position information given by optical sensors 25, the logic 17 controls discarding valves 18. An air jet controlled by the discarding valve 25 removes a discarded package from the conveyor 3. Instead of optical sensors 25, other sensors maybe used to locate a defective package on the conveyor. Instead of the discarding valve 25, other discarding devices such as push rods and the like, may be used to remove a defective package from the production line.

The invention is suitable for use testing, for example, sausage and meatball packages and for testing juice and milk packages.

In accordance with the invention, a possible leak in a package may alternatively be detected so that a package containing the test gas is not put in a chamber, but after the test gas has been added into the package, the hydrogen gas leaking from the package is detected by hydrogen gas sensitive detecting apparatus that is manually placed in the immediate vicinity of the package and is moved around the package. In such a way, the leaking point can be found. Addition of test gas into the package is typically performed before the closing of the package, but the test gas may alternatively be added, for example, by injection into a closed package, where after the injection opening is closed.

The method of the invention can also be used for increasing the shelf life of the quality of a product in the form of a foodstuff or a pharmaceutical. In the method, which may be termed the shielding gas method, a gas mixture having a composition 0.0001–6% by volume, preferably 0.5–5% by volume and more preferably 1–4% by volume, of hydrogen and a remainder of nitrogen is introduced in to the product, by surrounding the product with the gas mixture, whereafter the product is packed in an airtight, preferably aseptic package. The hydrogen in the gas mixture reacts with the dissolved oxygen in the product, reducing the amount of dissolved oxygen. Furthermore, hydrogen diminishes the amount of oxygen remaining in the gas space of the package after the closing of the package. The product may, for example, be liquid, such as juice, in which case the package is preferably a cardboard package. The nitrogen in the gas mixture may be partially or entirely replaced by carbon dioxide. In such a case, the amount of carbon dioxide is preferably 10–40%, but may also be in the range of 40–70% and even 70–100%.

The invention has been explained above by means of examples only, and it is to be noted that the invention can be implemented in many ways within the scope of the appended claims. Hence, it is, for example, possible that the chamber 7, i.e., the measuring dome, and the measuring space 11 are one and the same chamber. The conveyor means for conveying the package to the measuring station and from there onwards may naturally deviate from those disclosed above. The control logic 17 may be adapted to register the measurement results of several, for example, four, measured packages on different positioning conveyors, and if one of the packages exceeds the set limit value, the control logic registers the product to be discarded from the corresponding production line. Furthermore, the control logic 17 preferably registers the measurement results of the measured package (for follow-up). It is also possible to mark the package (product) with a test marking.

What is claimed is:

1. A method for detecting a leak in a sealed package containing a product in the form of a foodstuff or a pharmaceutical, the method comprising:

adding a hydrogen-containing test gas mixture into the package, the test gas mixture being at least substantially oxygen-free and having a hydrogen content ranging from 0.0001% to less than 5% by volume, the adding being to subject the contents thereof to a first pressure;

maintaining the package in a chamber having a predetermined gas pressure, the maintaining being for a predetermined time;

maintaining the hydrogen gas concentration of the gas in the chamber below a reference concentration, the reference concentration being less than the hydrogen gas concentration in the package immediately after addition of hydrogen gas to the package;

detecting, after the predetermined time, the presence of hydrogen gas content in a measuring space in gas flow relationship with the chamber, with a detection apparatus;

wherein the package is considered defective if hydrogen has leaked outside the package and a detected hydrogen gas content is higher by a predetermined value than the reference concentration.

2. The method as claimed in claim 1, wherein the package has a pressure close to air pressure, i.e. about 1000 mbar and wherein the gas pressure in the chamber is lower that the first pressure within the package.

3. The method as claimed in claim 2, wherein the gas pressure in the chamber is at least 50 mbar lower than the first pressure within the package.

4. The method as claimed in claim 3, wherein the gas pressure in the chamber is 200–400 mbar lower than the first pressure within the package.

5. The method as claimed in claim 1, wherein the predetermined time is in the range of 0.5 to 60 seconds.

6. The method as claimed in claim 5, wherein the predetermined time is 0.5 to 1 second.

7. The method as claimed in claim 1, wherein the gas pressure within the chamber is 200–1000 mbar.

8. The method as claimed in claim 1, wherein the package is a vacuum package, and wherein the gas pressure within the chamber is not greater than 800 mbar.

9. The method as claimed in claim 8, wherein the gas pressure within the chamber is at least 200 mbar.

10. The method as claimed in claim 1, wherein a gas mixture having a hydrogen gas content of at least 0.5% by volume is used as the test gas mixture.

11. The method as claimed in claim 10, wherein a gas mixture having a substantial concentration of nitrogen gas is used as the test gas.

12. The method as claimed in claim 11, wherein a gas mixture having a nitrogen gas content of about 50% by volume is used as the test gas.

13. The method as claimed in claim 12, wherein a gas mixture containing about 10–50% by volume of carbon dioxide is used as the test gas.

14. The method as claimed in claim 1, wherein a gas mixture having a hydrogen gas content of at least 0.5% by volume is used as the test gas mixture.

15. The method as claimed in claim 14, wherein a gas mixture having a substantial concentration of nitrogen gas is used as the test gas.

16. The method as claimed in claim 15, wherein a gas mixture having a nitrogen gas content of about 50% by volume is used as the test gas mixture.

17. The method as claimed in claim 16, wherein a gas mixture containing at least 10 to 50% by volume of carbon dioxide is used as the test gas mixture.

18. A method for adding gas to a package containing a product in the form of a foodstuff of a pharmaceutical, the method comprising:

adding a hydrogen-containing test gas mixture into the package, the test gas mixture being at least substantially oxygen-free and having a hydrogen content ranging from 0.0001% to less than 5% by volume, the adding being to subject the contents thereof to a first pressure;

maintaining the package in a chamber having a predetermined gas pressure, the maintaining being for a predetermined time;

maintaining the hydrogen gas concentration of the gas in the chamber below a reference concentration, the reference concentration being less than the hydrogen gas concentration in the package immediately after addition of hydrogen gas to the package;

detecting, after the predetermined time, the presence of hydrogen gas content in a measuring space in gas flow relationship with the chamber, with a detection apparatus;

wherein the package is considered defective if hydrogen has leaked outside the package and a detected hydrogen gas content is higher by a predetermined value than the reference concentration.

19. The method as claimed in claim 18, wherein the package is a vacuum package, and wherein the gas pressure within the chamber is not greater than 800 mbar.

20. The method as claimed in claim 19, wherein the gas pressure within the chamber is at least 200 mbar.

* * * * *